(No Model.)
S. H. SHORT.
MOTOR MECHANISM FOR ELECTRIC CARS.
No. 460,040. Patented Sept. 22, 1891.
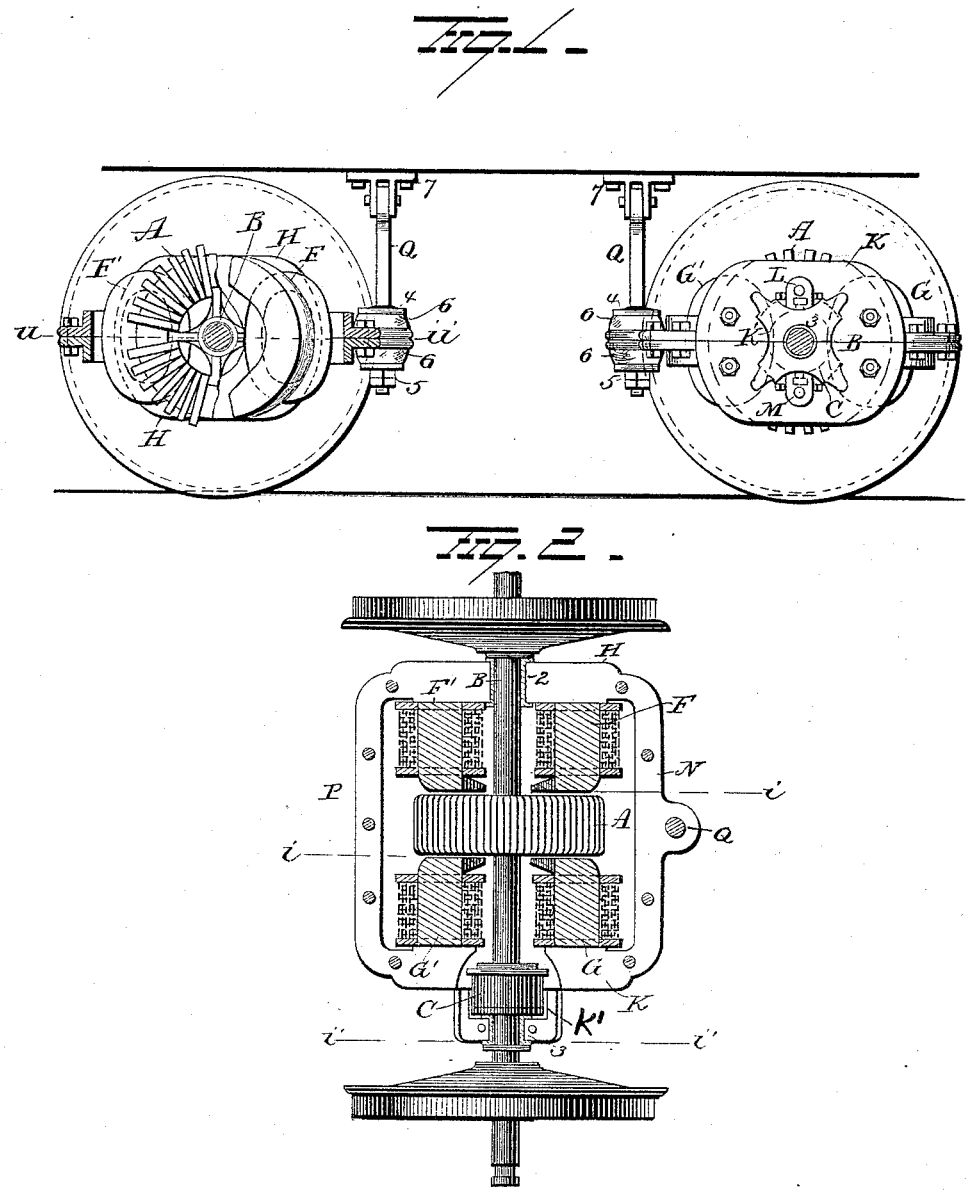
Witnesses
O. T. Nottingham
G. F. Downing
Inventor
Sidney H. Short
By his Attorney

UNITED STATES PATENT OFFICE.

SIDNEY H. SHORT, OF CLEVELAND, OHIO, ASSIGNOR TO THE SHORT ELECTRIC RAILWAY COMPANY, OF SAME PLACE.

MOTOR MECHANISM FOR ELECTRIC CARS.

SPECIFICATION forming part of Letters Patent No. 460,040, dated September 22, 1891.

Application filed November 1, 1890. Serial No. 370,036. (No model.)

*To all whom it may concern:*

Be it known that I, SIDNEY H. SHORT, of Cleveland, in the county of Cuyahoga and State of Ohio, have invented certain new and useful Improvements in Motor Mechanism for Electric Cars; and I do hereby declare the following to be a full, clear, and exact description of the invention, such as will enable others skilled in the art to which it appertains to make and use the same.

This invention relates to an electrically-propelled car or vehicle in which the armature of a propelling-motor is connected directly with a driving wheel or axle, by direct connection being understood one which imparts a revolution to the driving wheel or axle to each revolution of the armature.

It consists in mounting the armature on the axle, with which it is directly connected, so that no journal-bearings for the armature are necessary, and also mounting the field-magnets on the same axle by means of journal-bearings and preventing its rotation on said bearings by a connection with another part of the car, as the car-body, or the other axle, or a motor thereon, or the like, adapted to hold the field-magnets from rotating, although it may be, and preferably does, permit a rocking to take place, which will ease the stress caused by jolting. To permit this rocking, springs or buffers are placed between the part with which the connection is made and the field-magnets, and the whole arrangement is such that the field-magnets may have a slight universal movement with reference to the car-body. This mode of mounting and connecting is included, generally, in the invention irrespective of the precise form of field-magnets or armature. The invention, however, covers special features in regard to these—that is to say, first, the field-magnets are arranged symmetrically with reference to the car-axle, so that they balance themselves thereon; second, the field-magnets are arranged horizontally; third, the field-magnets are placed above (or not materially below) the lowest part of the armature, and, fourth, the field-magnets are placed at the sides of the armature on the car-axle parallel with the said axle. The last two of these special features are included in the invention irrespective of the mounting of the field-magnets on the car-axle, as well as in connection with field-magnets mounted as above set forth.

Other special features included in the invention will be hereinafter indicated.

In the accompanying drawings, Figure I is a partial view in longitudinal section, on slightly different planes, of an electric car provided with motor mechanism constructed in accordance with the invention, the left of the figure being on line *i* of Fig. II and the right in a plane corresponding to line *i'*; and Fig. II is a partial view in horizontal section on line *i i* of Fig. I.

The armature A for each of the propelling-motors is mounted axially with reference to the corresponding driving-axle B, with which it is connected directly; or, in other words, the axis of the driving-axle is coincident, or nearly so, with that of the armature, and the latter makes one revolution for each revolution of the driving-axle. As shown, the armature (of the well-known Brush type, being composed of a metal strip wound on itself and provided with bobbins in notches in the edges) is mounted on the axle B and is connected directly therewith, being keyed or otherwise fastened thereon, so that it turns with the axle. The commutator C is also keyed or otherwise fastened on the axle B. The field-magnets F F' and G G' of each motor are placed symmetrically on each side of the axle B and at the sides of the armature A, they being disposed horizontally parallel with the axle B. They project from the yokes or chairs H and K, which are provided with journal-bearings 2 and 3, or, in other words, are loosely mounted on the axle, so as to be supported by the latter and at the same time permit it to turn freely. The journal-bearing 3 is formed in a bracket K', which projects from the yoke K outside the commutator.

At L and M are the commutator-brushes. The yokes H and K are connected with each other by the arms N and P.

To facilitate the application of the field-magnets to the axle, the magnet-frame composed of the yokes H K, with the bracket K' and connecting-arms N and P, is made in two parts, the division being longitudinally of the axle through the journal-bearings, as shown. The parts are bolted together.

To prevent the field-magnets from turning with the axle B a connection Q is shown between the arm N and the car-body. The connection shown consists of a jointed rod provided with a flange 4 and nuts 5, with springs or buffers 6 interposed between the same and the arm N. The rod is pivoted at 7 to a bracket depending from the car-body. These springs or buffers 6, which may be of soft vulcanized rubber or other material, serve to permit a certain rocking movement of the field-magnets on the axle B. By this peculiar mounting of the field-magnets the latter are not only allowed to have a rocking motion upon the car-axle, but also together with the car-axle a lateral motion with reference to the car-body, whereby the jolts of the car are rendered harmless upon the field-magnets, which latter may be said to be connected with the car-body by a universal joint. Any suitable connection of the coils of the field and armature may be made. Instead of having the field-magnets fixed or non-rotative and the armature rotating, it is evident that the armature might be held from rotation, as described, for the field-magnets and the latter be keyed on or otherwise connected with the axle B, so as to turn therewith. It will be understood that this reversed arrangement is included in the invention as a substitute for that particularly described without further specification herein.

Having fully described my invention, what I claim as new, and desire to secure by Letters Patent, is—

1. The combination, with a driving car-axle and a ring-armature mounted on and directly connected with said axle, so as to rotate in unison therewith, of field-magnets located between the armature and the car-wheels and provided with yokes which are mounted by means of journal-bearings on said axle, and an elastic connection between the car and the field-magnets for preventing the rotation of the latter and allowing them a yielding rocking movement, substantially as set forth.

2. The combination, with a car-axle, of a motor comprising a ring-armature mounted on and directly connected with said axle, so as to rotate in unison therewith, and field-magnets projecting at the sides of said armature from yokes perforated for the passage of said axle and provided with journal-bearings thereon, and an elastic connection between the car and the field-magnets for preventing the rotation of the latter, substantially as set forth.

3. The combination, with a driving car-axle and a ring-armature mounted on and directly connected with said axle, so as to rotate in unison therewith, of field-magnets located between the armature and the car-wheels and provided with yokes which are mounted by means of journal-bearings on said axle, and a laterally-movable support and elastic connections between the car and field-magnets for preventing the rotation of the latter and allowing them a yielding rocking movement and preventing the lateral movement of the car to be transmitted to the field-magnets, substantially as set forth.

4. The combination, with a driving car-axle and a ring-armature mounted on and directly connected with said axle, so as to rotate in unison therewith, of field-magnets located on opposite sides of the armature, divided yokes supporting the field-magnets and provided with divided bearings journaled on said axle, and a device for retaining said yokes and field-magnets against rotation, substantially as set forth.

5. In an electric locomotive, the combination of a motor-car having the field-magnets, an electric propelling-motor centrally mounted upon a car-axle, so as to permit of a rocking motion thereon, an articulated connection between the car and field-magnets to permit the latter to move laterally with reference to the former, and an armature axially mounted upon and directly connected with the car-axle, substantially as described.

In testimony whereof I have signed this specification in the presence of two subscribing witnesses.

SIDNEY H. SHORT.

Witnesses:
A. B. CALHOUN,
A. F. WORTZ.